United States Patent Office 3,282,783
Patented Nov. 1, 1966

3,282,783
METHOD FOR CAUSING HYPOCHOLESTEROLEMIC ACTIVITY IN ANIMALS WITH POLY-N-LOWER ALKYL DERIVATIVES OF POLYAMINO ANTIBIOTICS
Hubert Vanderhaeghe, Kessel-lo, Belgium, assignor to Recherche et Industrie Therapeutiques R.I.T., Genval, Belgium, a Belgian corporation
No Drawing. Filed Mar. 25, 1963, Ser. No. 267,835
Claims priority, application Great Britain, Apr. 3, 1962, 12,790/62; Oct. 15, 1962, 38,953/62
4 Claims. (Cl. 167—65)

This invention pertains to new organic compounds demonstrating hypocholesterolemic properties and to methods for imparting such properties into known compounds. In particular this invention relates to alkylated derivatives of compounds containing an amino sugar moiety; e.g., polyamino antibiotics such as neomycin, neamine, kanamycin, streptomycin, dihydrostreptomycin, desoxystreptomycin, dihydrodesoxystreptomycin, zygomycin, catenulin, hydroxymycin, paromomycin and amminosidin.

The above antibiotics are characterized by the presence of one or more aminocycloalcohol group and one or more aminosugar group. For example, the antibiotic neamine is composed of a neosamine C moiety and a deoxystreptamine moiety:

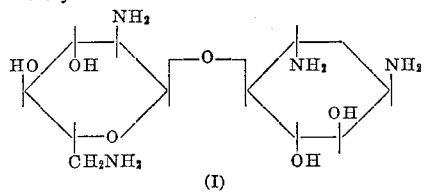
(I)

Similarly neomycin C (II) is composed of neamine, ribose and neosamine C while neomycin B (III) comprises neamine, ribose and neosamine B.

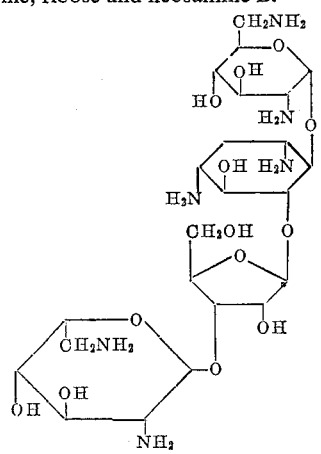
II

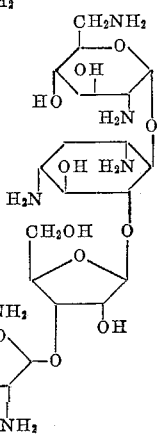
III

Similar interrelations have been shown to exist between zygomycin, catenulin, hydroxymycin, paromomycin and amminosidin.

The compounds of the present invention are derivatives of the above antibiotics wherein at least one and preferably the majority of the amino groups have been alkylated. The resulting compounds are substantially devoid of antibiotic properties by virtue of this alkylation. Surprisingly, however, these alkylated products are hypocholesterolemic agents demonstrating the ability to normalize serum and tissue lipid levels.

By the term "alkylation," is meant the introduction of one or more alkyl groups having the formula:

$$-CH_2-(C_nH_{2n})-H$$

wherein $n$ may have a value of 0 to 5 inclusively. Also embraced are the simple substituted alkyl groups:

$$-CH_2-(C_nH_{2n})-R$$

wherein R includes phenyl and substituted phenyl, e.g., hydroxyphenyl, (lower) alkylphenyl, (lower) alkoxyphenyl, trifluoromethylphenyl and aminophenyl, including mono and di(lower)alkylaminophenyl. When $n$ has a value of 1 to 5, the group R may also constitute such common substituents as hydroxy, (lower) alkoxy, aryloxy, trifluoromethyl and amino. While such substituents may thus be employed, the invention will be typified herein by straight or branched alkyl groups, i.e., R is hydrogen. Of these alkyl groups, methyl is preferred.

The introduction of the alkyl groups is preferably accomplished by reductive alkylation. The preferred reductive alkylation entails treating the particular antibiotic with a carbonyl compound such as an aldehyde or ketone, in the presence of a source of hydrogen atoms. An aldehyde of the structure:

$$H-\overset{O}{\underset{\|}{C}}-(C_nH_{2n})-H$$

is preferred in view of its greater reactivity. The hydrogen atom source may be either nascent hydrogen (as from a metal acid combination) or more preferably gaseous hydrogen in the presence of a catalyst. Palladium, platinum oxide and nickel are examples of suitable catalysts but other ones known to the art may conveniently be used. Water is a suitable solvent, more preferably used with an acid, e.g., acetic acid, for solubilizing the amine completely. Other solvents are also suitable.

Alternatively the reductive alkylation may be performed by utilization of the Leuckart reaction employing excesses of the particular aldehyde and formic acid or a functional equivalent thereof as the source of hydrogen atoms with the concurrent formation of carbon dioxide.

It can be seen that by utilization of such reductive alkylation procedures, one or two alkyl groups may be introduced into each primary amino group. While conditions may obviously be limited so that less than all of the available amino groups of the aminosugars and aminoalcohols are alkylated, it is preferred to employ an excess of reagent whereby the antibiotic is exhaustively alkylated. For example while neomycin containing six amino groups could be theoretically methylated with the uptake of twelve methyl groups, introduction of only ten methyl groups is actually observed upon exhaustive methylation. Neamine on the other hand upon exhaustive alkylation contains the theoretically eight methyl groups, thus yielding a compound of the formula:

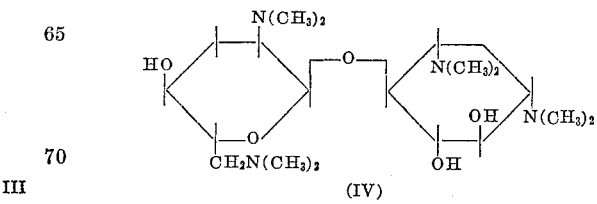
(IV)

These N-alkylated compounds prepared according to the present invention are easily transformed into corresponding quaternary ammonium salts, using methods well known to the art. This reaction is preferably carried out at room temperature in an inert solvent such as acetonitrile for instance. The quaternary ammonium salts and their preparation are comprised in the scope of the present invention.

Examples of such pharmaceutically acceptable quaternary ammonium salts are the chloro, bromo or iodomethylate and the corresponding ethylate, the chloro, and bromobenzylate or allylate and the like.

Examples of pharmaceutically acceptable addition salts which may likewise be formed include the hydrochloride, sulfate, phosphate, maleate, fumarate, succinate, tartrate, oxalate, citrate, methanesulfonate, ethanesulfonate and the like.

The minimum daily dose for the effective reduction of lipid levels is about 1 g. (as weight of base) for the human being with the preferred doses comprised between 2 and 20 g. Higher doses can however be safely administered since it appears that the compounds are not substantially absorbed, the mechanism of action presumably being through a reduced absorption of lipid materials from the gastrointestinal tract.

The compounds of the present invention are administered orally using any pharmaceutical form known to the art for such administration. Examples of pharmaceutical forms are powders, capsules, tablets, syrups, sustained release forms and the like, the capsule form being preferred in practice.

The following examples will serve to further illustrate the present invention, they should not however constitute a limitation thereof.

*Example 1*

Neamine (7.1 g.) is slowly added into a mixture of 1 g. of formic acid (98%) and 2.5 ml. of water. There is then added a mixture of 15 g. of 35% formaldehyde solution and 19 g. of formic acid (98%) and the mixture is refluxed for 3 hours. Hydrochloric acid (2 ml.) is then added and the medium is evaporated under reduced pressure to one-half of its volume. Another 4 ml. portion of hydrochloric acid in 5 ml. of water is added and the medium is concentrated under reduced presure up to getting a gel. This residue is taken up with a solution of 6 ml. of hydrochloric acid in 25 ml. of water and the obtained solution is evaporated to dryness. This residue is taken up with water and the obtained solution is evaporated to dryness. The residue is triturated with a small volume of absolute ethanol and, by addition of ether, 11.55 g. of N-octamethyl neamine hydrochloride is obtained.

The obtained product is dissolved in 400 ml. of water (carbon dioxide-free) and the solution is poured onto a column of 120 ml. of Dowex 2×8 resin. Elution is carried out with 2 l. of water. The eluate is evaporated to dryness and the residue is taken up with absolute ethanol which is thereafter evaporated. The residue is dissolved in hot acetone and, by cooling, 4.63 g. of N-octamethyl neamine is obtained, M.P. 202–204° C., $[\alpha]_D = +91°(\pm 1)(c.=1 \text{ in water})$ $[\alpha]_D = +98°(\pm 1)(c.=1 \text{ in 2 N sulfuric acid})$ This product is devoid of the antibiotic activity of the starting neamine against *Escherichia coli* and *Micrococcus pyogenes* var. *aureus* (ATCC 6538P).

When N-octamethyl neamine is examined by ascending paper chromatography on Schleicher & Schüll No. 2043 (paper washed with acid) in the system n propanol/acetic acid/pyridine/water 9:1:1:10 followed by detection with ninhydrin, a blue-violet spot with $Rf=0.60(\pm 0.03)$ is obtained. Under the same conditions, the starting neamine gives a violet-brown spot with $Rf=0.42(\pm 0.03)$.

The O-tetraacetyl-N-octamethyl neamine is obtained as follows: N-octamethyl neamine (3.10 g.) is dissolved in 180 ml. of acetic anhydride and this solution is maintained for 4 days at room temperature. The medium is then evaporated to dryness and the residue is dissolved in 25 ml. of benzene which is thereafter evaporated. The residue is extracted with two portions of 100 ml. of petroleum ether (eb. 40–60° C.). By cooling of the solution, O-tetraacetyl-N-octamethyl neamine separates $[\alpha]_D = +70°(\pm 1)(c.=1 \text{ in absolute ethanol})$, M.P. 144–146° C.

*Example 2*

Water (180 ml.) and 23 g. of 35% formaldehyde solution are poured into a hydrogenation vessel and 9 g. of neamine sulfate is dissolved in the mixture. Platinum oxide (600 mg.) is then added and the medium is shaken for 5½ hours under hydrogen pressure of 2 kg. per square centimeter. After that reaction time, the residual hydrogen is eliminated and the catalyst is removed by filtration. Platinum oxide (600 mg.) is again added and the medium is shaken overnight under hydrogen pressure of 2 kg. per square centimeter. The residual hydrogen is then eliminated, the catalyst is removed by filtration and the solvent is evaporated under reduced pressure.

The residue is covered with absolute ethanol. After triturating, a suspension is obtained and the precipitate is filtered and dried to yield 10 g. of N-octamethyl neamine sulfate, M.P. (dec.) ca. 225 to 235° C., $[\alpha]_D = +60°(\pm 1)(c.=1 \text{ in water})$ and $[\alpha]_D = +60°(\pm 1)(c.=1 \text{ in normal sulfuric acid})$ After passage on a column of Dowex 2×8 resin as indicated in Example 1, N-octamethyl neamine is obtained, M.P. 204–206° C. (unchanged after addition of the product obtained in Example 1), $[\alpha]_D = 91.5°(\pm 1)(c.=1 \text{ in water})$

*Example 3*

Acetic acid (15 ml.) is poured into an hydrogenation vessel and neamine (0.300 g.) is dissolved therein. Platinum oxide (50 mg.) and 5 ml. of 30% formaldehyde solution are added and the mixture is shaken for 3 hours under hydrogen pressure of 3 kg. per square centimeter.

After that reaction time, the residual hydrogen is eliminated, the catalyst is removed by filtration and the solvent is evaporated under reduced pressure.

The residue is taken up with 15 ml. of normal hydrochloric acid and the obtained solution is concentrated under reduced pressure, up to a small volume. By addition of absolute ethanol, N-octamethyl neamine hydrochloride is obtained. This product exhibits the same characteristics as those of the product obtained in Example 1.

*Example 4*

N-octamethyl neamine (3 g.) obtained in Example 1 is dissolved in 850 ml. of acetonitrile and 32 g. of methyl iodide is added thereto at room temperature. Crystals separate gradually. After standing during one week, the medium is filtered, the crystals are washed with methylene chloride to yield 3.9 g. of N-octamethyl neamine methiodide, M.P. (dec.) ca. 210–220° C.

*Example 5*

Acetic acid (60 ml.) is poured into a hydrogenation vessel and 2.4 g. of commercial neomycin—i.e. a mixture of neomycin B and some neomycin C— is dissolved therein. There are then added to this solution 250 mg. of platinum oxide and 5 ml. of 30% formaldehyde solution. The mixture is shaken for 3 hours under hydrogen pressure of 3 kg. per square centimeter.

After evacuation of hydrogen and filtration of the catalyst, the solvent is evaporated under reduced pressure.

The residue is taken up with a small volume of normal hydrochloric acid and, after addition of ethanol, there is obtained the hydrochloride of N-methylated neomycin which is filtered and dried.

The obtained N-methylated neomycin hydrochloride is devoid of the antibiotic activity of the starting neomycin against *Escherichia coli* and *Micrococcus pyogenes* var. *aureus* (ATCC 6538P).

Example 6

Water (50 ml.) is poured into an hydrogenation vessel and 3.6 g. of commercial neomycin—i.e. a mixture of neomycin B and some neomycin C—is dissolved therein. The pH of the solution is brought between 3 and 4 by addition of sulfuric acid (2 N). Platinum oxide (200 mg.) and 20 ml. of 30% formaldehyde solution are added thereto and the medium is shaken for 3 hours under hydrogen pressure of 3 kg. per square centimeter.

After that reaction time, the residual hydrogen is evacuated and the catalyst is filtered. The solvent is evaporated under reduced pressure and the residue is covered with absolute alcohol. After triturating, a suspension is obtained and the precipitate is then filtered and dried. The isolated N-methylated neomycin sulfate is devoid of the antibiotic activity of the starting neomycin sulfate against *Escherichia coli* and *Micrococcus pyogenes* var. *aureus* (ATCC 6538P).

Example 7

Water (150 ml.) is poured into a hydrogenation vessel and 21.6 g. of commercial neomycin sulfate—i.e. a mixture of neomycin B and some neomycin C, $[\alpha]_D = +55°(\pm 1)$ (c.=1 in water)—is dissolved therein. Platinum oxide (600 mg.) and 60 ml. of 30% formaldehyde solution are added thereto and the medium is shaken for 4½ hours under hydrogen pressure of 3 kg. per square centimeter. After that reaction time, the residual hydrogen is eliminated and the catalyst is removed by filtration. Platinum oxide (600 mg.) is again added and the medium is shaken for 6 hours under hydrogen pressure of 3 kg. per square centimeter. The residual hydrogen is then eliminated, the catalyst is removed by filtration and the solvent is evaporated under reduced pressure.

The residue is covered with absolute ethanol. After triturating, a suspension is obtained and the precipitate is filtered, washed well with methanol and dried to yield 24.1 g. of N-methylated neomycin sulfate $$[\alpha]_D = +44°(\pm 1)$$

(c.=1 in water). This product is devoid of the antibiotic activity of the starting material as was the product obtained in Example 6.

The obtained product is dissolved in 1 l. of water (carbon dioxide-free) and the solution is poured onto a column of 200 ml. of Dowex 2×8 resin. Elution is carried out with 1 l. of water. The eluatae is evaporated to dryness and the residue is taken up with absolute ethanol which is thereafter evaporated. The residue is taken up in hot acetone and, by cooling, N-methylated neomycin $[\alpha]_D = +68°(\pm 1)$ (c.=1 in water) is obtained. This product is devoid of the antibiotic activity of the starting neomycin sulfate against *Escherichia coli* and *Micrococcus pyogenes* var. *aureus* (ATCC 6538P).

When N-methylated neomycin is examined by ascending paper chromatography on Schleicher & Schüll No. 2043 (paper washed with acid) in the system n propanol/acetic acid/pyridine/water 9:1:1:10 followed by detection with ninhydrin, a blue-grey spot with $$R_f = 0.51(\pm 0.03)$$

is obtained. Under the same conditions, the starting neomycin (base) gives a violet-brown spot with $$R_f = 0.35 (\pm 0.03)$$

Example 8

Water (150 ml.) is poured into a hydrogenation vessel and 10.8 g. of commercial neomycin sulfate—i.e. a mixture of neomycin B and some neomycin C—is dissolved therein. There is then added to this solution 30 ml. of 35% formaldehyde solution and 4 g. of 10% palladium-on-charcoal. The medium is shaken for 2 hours under hydrogen pressure of 2 kg. per square centimeter. After that reaction time, the residual hydrogen is eliminated, the catalyst is removed by filtration and the solvent is evaporated under reduced pressure.

The residue is covered with absolute ethanol. After triturating, a suspension is obtained and the precipitate is filtered, washed well with methanol and dried to yield 10 g. of N-methylated neomycin sulfate devoid of the antibiotic activity of the starting neomycin sulfate against *Escherichia coli* and *Micrococcus pyogenes* var. *aureus* (ATCC 6538P).

Example 9

Water (180 ml.) and 23 g. of 35% formaldehyde solution are poured into a hydrogenation vessel and 10 g. of commercial kanamycin sulfate is dissolved in the mixture. Platinum oxide (600 mg.) is then added and the medium is shaken for 4 hours under hydrogen pressure of 3 kg. per square centimeter. After that reaction time, the residual hydrogen is eliminated and the catalyst is removed by filtration. Platinum oxide (600 mg.) is again added and the medium is shaken overnight under hydrogen pressure of 3 kg. per square centimeter. The residual hydrogen is then eliminated, the catalyst is removed by filtration and the solvent is evaporated under reduced pressure.

The residue is covered with absolute ethanol. After triturating, a suspension is obtained and the precipitate is filtered and dried to yield N-methylated kanamycin sulfate. This product is devoid of the antibiotic activity of the starting kanamycin sulfate against *Escherichia coli* and *Micrococcus pyogenes* var. *aureus* (ATCC 6538P).

The obtained product is dissolved in 400 ml. of water (carbon dioxide-free) and the solution is poured onto a column of 120 ml. of Dowex 2×8 resin. Elution is carried out with 500 ml. of water. The eluate is evaporated to dryness and the residue is taken up with absolute ethanol which is thereafter evaporated. The residue is taken up in hot acetone and N-methylated kanamycin is obtained by cooling.

When N-methylated kanamycin is examined by ascending paper chromatography on Schleicher & Schüll No. 2043 (paper washed with acid) in the system n propanol/acetic acid/pyridine/water 9:1:1:10 followed by detection with ninhydrin, a spot with $R_f = 0.48$ ($\pm 0.03$) is obtained. Under the same conditions, with the starting kanamycin (base) a spot with $R_f = 0.42$ ($\pm 0.03$) is obtained.

Example 10

Following the method described in Example 7 but employing 21.6 g. of paromomycin sulfate instead of the 21.6 g. of neomycin sulfate therein specified, there is obtained the N-methylated paromomycin sulfate and N-methylated paromomycin free base. Both these products are devoid of the antibiotic activity of the starting paromomycin sulfate against *Escherichia coli* and *Micrococcus pyogenes* var. *aureus* (ATCC 6538P).

Example 11

A solution of 1.61 g. of neamine in 25 ml. of water is poured into a hydrogenation vessel. There is then added thereto 2.6 g. of acetaldehyde and 400 mg. of platinum oxide. The mixture is shaken for 3 hours under hydrogen pressure of 3 kg. per square centimeter.

After that reaction time, the residual hydrogen is evacuated and the catalyst is filtered. The filtrate is adjusted to pH 2.5 with N hydrochloric acid and the solvent is evaporated to dryness. The residue is taken up with a small volume of absolute ethanol, the medium is filtered and ether is added thereto. In this way, there is obtained a precipitate which is filtered and dried to yield 2.620 g. of N-ethylated neamine hydrochloride. This product is devoid of the antibiotic activity of the starting neamine against *Escherichia coli* and *Micrococcus pyogenes* var. *aureus* (ATCC 6538P).

When N-ethylated neamine hydrochloride and the starting neamine (hydrochloride) are examined by ascending paper chromatography on Schleicher & Schüll No. 2043 (paper washed with acid) in the system n propanol/acetic acid/pyridine/water 9:1:1:10, followed by detection with ninhydrin, the $R_f$ values and the colors of the spots are different.

*Example 12*

Neamine (6.44 g.) and isobutyraldehyde (5.9 g.) are dissolved in 20 ml. of ethanol and 500 mg. of platinum oxide is added to the solution. The mixture is shaken for 3 hours under hydrogen pressure of 3 kg. per square centimeter.

After that reaction time, the residual hydrogen is evacuated and the catalyst is filtered. The filtrate is adjusted to pH 2.5 with N hydrochloric acid and the solvent is evaporated to dryness. The residue is taken up with a small volume of absolute ethanol. In this way, there is obtained a precipitate which is filtered and dried to yield N-isobutylated neamine hydrochloride.

Against *Escherichia coli* and *Micrococcus pyogenes* var. *aureus* (ATCC 6538P), the antibiotic activity of N-isobutylated neamine hydrochloride is inferior to that of the starting neamine.

When N-isobutylated neamine hydrochloride and the starting neamine (hydrochloride) are examined by ascending paper chromatography on Schleicher & Schüll No. 2043 (paper washed with acid) in the system n propanol/acetic acid/pyridine/water 9:1:1:10 followed by detection with ninhydrin, the $R_f$ values and the colors of the spots are different.

*Example 13*

The following derivatives are prepared by reductive alkylation of neomycin with the named aldehydes in accordance with the above procedures. The corresponding derivatives of the other basic antibiotics may obviously be prepared in the same way.

| Aldehyde: | Neomycin derivative |
|---|---|
| Glycolaldehyde | N-2-hydroxyethyl |
| Methoxyacetaldehyde | N-2-methoxyethyl |
| α-Ethoxypropionaldehyde | N-2-ethoxypropyl |
| Monomethylaminoacetaldehyde | N-2-monomethylaminoethyl |
| Dimethylaminoacetaldehyde | N-2-dimethylaminoethyl |
| Methylethylaminoacetaldehyde | N-2-methylethylaminoethyl |
| Benzaldehyde | N-benzyl |
| Phenylacetaldehyde | N-2-phenylethyl |
| Phenoxyacetaldehyde | N-2-phenoxyethyl |
| o-Methoxybenzaldehyde | N-o-methoxybenzyl |
| p-Trifluoromethylbenzaldehyde | N-p-trifluoromethylbenzyl |
| p-Aminobenzaldehyde | N-p-aminobenzyl |
| p-Methylaminobenzaldehyde | N-p-methylaminobenzyl |
| p-Dimethylaminobenzaldehyde | N-p-dimethylaminobenzyl |

*Example 14*

| Ingredients: | Mg./capsule |
|---|---|
| N-methylated neomycin sulfate | 500 |
| Magnesium stearate | 20 |

The above ingredients are thoroughly mixed and filtered through an ASTM No. 50 screen into a No. 0 hard gelatin capsule, the volume being eventually adjusted with lactose or another classical inert ingredient as it is well known to the art.

About ten of these capsules are administered daily by the oral route to hyperchlolesterolemic persons. The administration of N-methylated neomycin can be carried out concurrently with other forms of therapy for hypercholesterolemia, such as elimination of fat in the diet for instance.

It is obvious that the hereabove indicated posology—such as the duration of the treatment—may fluctuate from one case to another according to the degree of the hypercholesterolemia and the individual patient.

*Example 15*

N-methylated kanamycin sulfate or neamine sulfate is used instead of the N-methylated neomycin sulfate indicated in Example 13.

*Example 16*

| Ingredients: | Mg./tablet |
|---|---|
| N-methylated neomycin sulfate | 500 |
| Anhydrous calcium phosphate, dibasic | 150 |
| Kaolin | 100 |
| Starch | 50 |
| Talc | 50 |

The N-methylated neomycin sulfate, the anhydrous calcium phosphate dibasic, the kaolin, 60% of the amount of starch and 40% of the amount of talc are thoroughly mixed and the mixture is compressed into tablets. The tablets are then ground and passed through an ASTM No. 14 screen.

The obtained granules are then thoroughly mixed with the remaining amounts of starch and talc and the mixture is compressed into tablets.

What is claimed is:

1. The method of causing hypocholesterolemic activity in animals comprising administering orally an effective amount of a hypocholesterolemic compound having no substantial antibiotic activity, said compound being selected from the group consisting of poly-N-lower alkyl derivatives of neomycin, neamine, kanamycin, zygomycin, catenulin, hydroxymycin, paromomycin and amminosidin.

2. The method of claim 1 in which the compound is poly-N-lower alkylneomycin.

3. The method of claim 1 in which the compound is poly-N-methylneomycin.

4. The method of causing hypocholesterolemic activity in animals comprising administering orally an effective amount of poly-N-benzylneomycin.

References Cited by the Examiner

UNITED STATES PATENTS

| 2,631,143 | 3/1953 | Braker | 260—210 |
| 2,736,725 | 2/1956 | Ritter | 260—210 |
| 2,937,117 | 5/1960 | Cottet | 167—65 |
| 3,057,777 | 10/1962 | Heyningen | 167—65 |

FOREIGN PATENTS

| 671,439 | 10/1963 | Canada. |
| 839,023 | 6/1960 | Great Britain. |

OTHER REFERENCES

Moses, Chem. Abst., vol. 56, p. 14889(h), 1962.
Paul, Chem. Abst., vol. 54, p. 2578(f), 1960.
Pfizer, The Pfizer Handbook of Microbial Metabolites, McGraw Hill, 1961, pp. 37, 40–43.
Plumb, The New York Times, April 21, 1959, p. C–39.
Rinehart, JACS, vol. 82, No. 15, pp. 3938–3946, Aug. 5, 1960.
Samuel, Circulation, vol. 24, pp. 578–591, September 1961.
Steiner, Chem. Abst., vol. 57, pp. 12986–12987 (1962).

JULIAN S. LEVITT, *Primary Examiner.*

LEWIS GOTTS, *Examiner.*

JOHNNIE R. BROWN, PAUL SABATINE, ANNA P. FAGELSON, GEORGE A. MENTIS,
*Assistant Examiners.*